May 7, 1946. W. T. BAILEY 2,399,616
APPARATUS FOR PRODUCTION AND APPLICATION OF REINFORCING ELEMENTS
Filed Feb. 12, 1942 5 Sheets-Sheet 1

Fig. 3.

May 7, 1946. W. T. BAILEY 2,399,616
APPARATUS FOR PRODUCTION AND APPLICATION OF REINFORCING ELEMENTS
Filed Feb. 12, 1942 5 Sheets-Sheet 3

INVENTOR.
Walter T. Bailey
BY C. L. Ehret
ATTORNEY.

May 7, 1946.  W. T. BAILEY  2,399,616
APPARATUS FOR PRODUCTION AND APPLICATION OF REINFORCING ELEMENTS
Filed Feb. 12, 1942  5 Sheets-Sheet 4

INVENTOR.
Walter T. Bailey
BY
C. D. Ehret
ATTORNEY.

May 7, 1946. W. T. BAILEY 2,399,616
APPARATUS FOR PRODUCTION AND APPLICATION OF REINFORCING ELEMENTS
Filed Feb. 12, 1942   5 Sheets-Sheet 5

INVENTOR.
Walter T. Bailey
BY
C. D. Ehret
ATTORNEY.

Patented May 7, 1946

2,399,616

UNITED STATES PATENT OFFICE 2,399,616

APPARATUS FOR PRODUCTION AND APPLICATION OF REINFORCING ELEMENTS

Walter T. Bailey, Philadelphia, Pa., assignor to Stokes & Smith Company, Philadelphia, Pa., a corporation of Pennsylvania Application February 12, 1942, Serial No. 430,560

14 Claims. (Cl. 93—56)

My invention relates to systems for producing reinforcing elements or tabs from strips of material and applying them to wrappers, sheets, or labels, generically termed wrappers.

In accordance with one aspect of my invention, feed rolls, or equivalent members, for effecting intermittent advance of the tab strip remain continuously in engagement therewith to ensure uniformity of the lengths of successive tabs, in avoidance of need to brake the strip and are preferably intermittently rotated through a uni-directional clutch, the reverse movement of whose operating member may be utilized to actuate a knife or equivalent to effect severance of the leading portion of the strip.

In accordance with another aspect of my invention, the edge of aforesaid knife is so shaped that in detachment of tabs it concurrently cuts from or toward, both edges of the strip to ensure the ends of the tabs are at right angles to its sides and that the leading portion of the strip during severance thereof is not laterally displaced or twisted askew by the knife.

Also in accordance with my invention, the operating mechanism for the devices which effect feed of the strip and detachment of tabs therefrom includes a disengageable connection reset in each cycle of wrapper-feeding means only if a wrapper has actually been segregated for application of tabs thereto.

My invention further resides in the features of construction, combination and arrangement hereinafter described and claimed.

For an understanding of my invention reference is made to the accompanying drawings, in which.

Figures 1, 2:
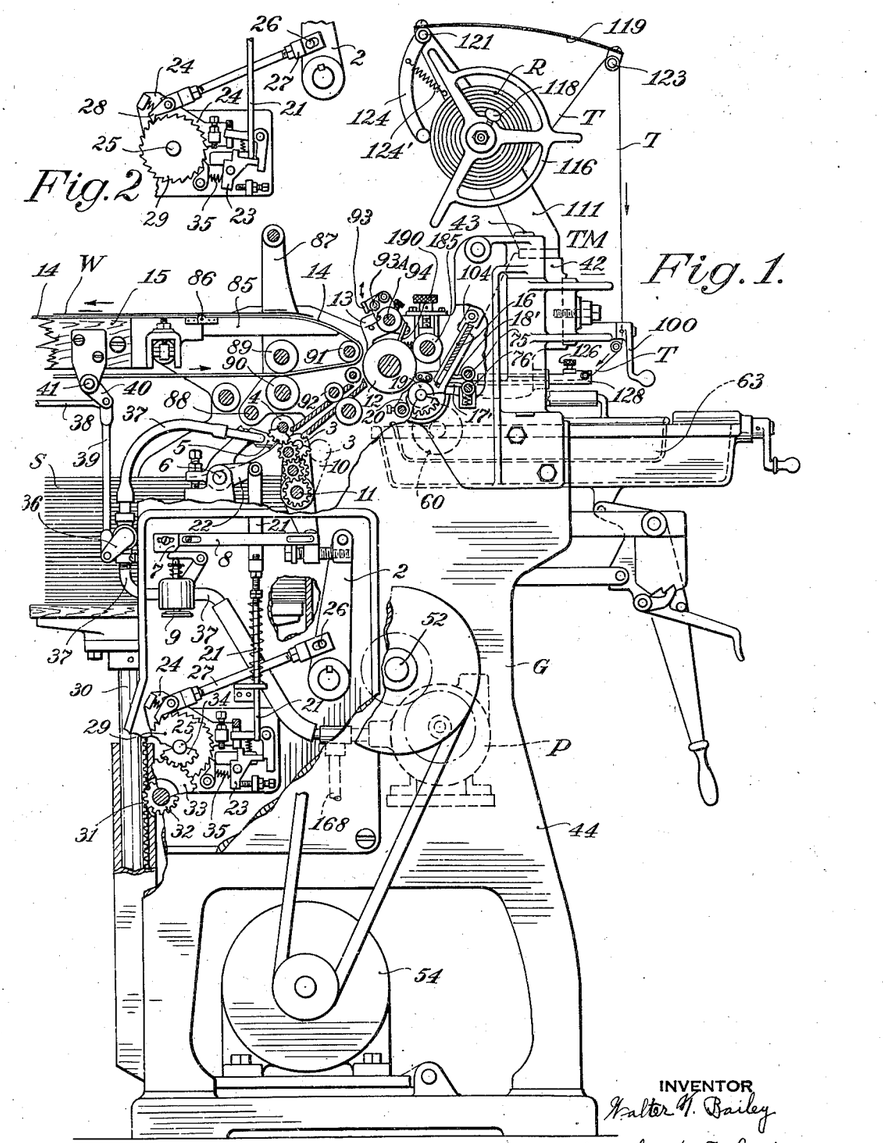
Fig. 1 is a side elevational view, with parts omitted and parts broken away, of mechanism for coating wrappers with adhesive and applying tabs thereto.
Fig. 2 is a detail view of parts shown in Fig. 1 in other of their operating positions.
Figure 3:
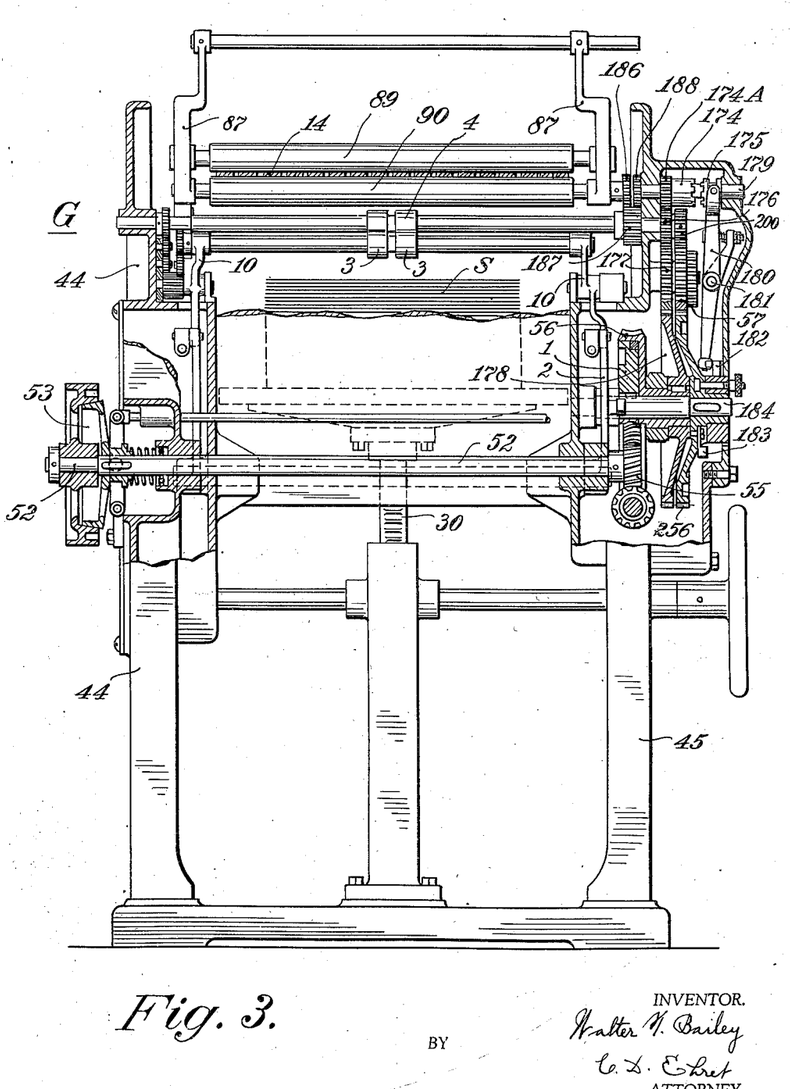
Fig. 3 is a front elevational view, with parts omitted and parts broken away, of the machine shown in Fig. 1.

For each cycle of the machine G, the cam 1, Fig. 3, which also serves as the driven element of a one-cycle clutch, effects rocking movement of arms 2, Figs. 1 and 3, to move the lower feed roll 3 toward and away from the upper feed roll 4 in timed relation to movement, toward and from the latter, of the suction gripper 5. As gripper 5 swings about its pivot 6 toward engagement with the top sheet or wrapper of stack S, the cam 7, adjustably secured to bar 8 reciprocated by aforesaid arm 2, effects closure of bleeder valve 9 for application of suction through gripper 5 to the forward end of the uppermost wrapper which while held by the suction gripper is moved by its adjacent or into contact with the feed roll 4. The arms 10 which carry the feed roll 3 thereupon swing about their pivots 11 under control of arm 2 to effect engagement of roll 3 with the underface of the separated sheet or wrapper and force it into engagement with the feed roll 4 intermittently driven from one cycle shaft 184 through gearing including gears 256, 57, 200.

At about this time in the cycle, the cam 7 depresses the stem of valve 9 to relieve the sheet of suction for feed by rolls 3 and 4 toward engagement with roll 12 supplied with adhesive by a pump, not shown, which delivers the adhesive to the body thereof disposed in the valley between the peripheries of rolls 12 and 185. The bar 190 which engages roll 12 from one end to the other serves as a dam preventing the adhesive, if its level rises higher than the top of roll 12, from overflowing into contact with blades 13, belt 14 or other parts to the left of the roll, Fig. 1. The coated wrapper or sheet is deflected by the stripper blades 13 from roll 12 onto the conveyor belt 14, against which the wrappers are held flat, during their transport, by suction applied to them through the belt and the perforated top of the housing 15.

By suitable design of the pneumatic circuits, a single source of suction, such as pump P, may be utilized to provide suction both for the gripper 5 and the conveyor housing 15.

For each wrapper separated by the suction gripper 5, the tabbing mechanism TM, generally of the type disclosed in United States Letters Patent 1,806,181 and 1,857,260 to Rider and in application Serial No. 397,894 filed June 13, 1941, delivers a group of tabs to roll 12 for transfer to a wrapper concurrently with application of adhesive thereto. The tabs are cut by knives 16, 16', one in each of the tabbing heads 98, 98', Fig. 4, from the strips T, T which are pulled from the rolls R, R by the pairs of feed rolls 17, 18, one pair in each head. The tabs, upon their detachment from the strips, are coated with adhesive applied to their wrapper-engaging faces by the adhesive-applying roll 19 from which they are deflected by stripper blades 20 into engagement with the adhesive-coated surface of roll 12 for application of adhesive to their box-engaging faces. Though only two stripper blades per head are shown, more of course may be provided and should be for wide tabs.

If for some reason or other, such as depletion of the stack S of wrappers, inoperativeness of pump P, or under control of the operator, the suction gripper 5 fails in any cycle of machine G to lift a wrapper from the stack, the tabbing mechanism TM is automatically temporarily disabled, in manner hereinafter described, by control mechanism shown in Fig. 16.

The stack S is fed upwardly, to maintain the top sheet thereof in proper position for separation by the suction gripper 5, under the control of mechanism, Figs. 1 and 2, including the rod 21 depending from arm 22 movable in unison with the suction gripper 5. When, for example, due to depletion of the stack S, the suction gripper 5 must move downwardly beyond a predetermined position in order to engage the top of the stack, the rod 21 trips the latch 23 and so permits the pawl-supporting frame 24 to rock about shaft 25 in clockwise direction to the position shown in Fig. 2 so that in the subsequent movement of arm 2 in counter-clockwise direction, the pin 26 carried thereby engages the end of a slot in the operating member 27 for the frame 24. The pawl 28, during the resulting movement of frame 24 in counter-clockwise direction, effects rotation of the ratchet 29 attached to shaft 25 connected through the rack 31 and gears 32, 33 and 34 to the stack-supporting plunger 30. During the return stroke of arm 2, the latch 23 is reset by its biasing spring 35; the stack elevating mechanism remains inoperative until rod 21 again trips latch 23.

The supply of wrappers and tabs to the conveyor belt 14 may be interrupted, without interruption of the intermittent advance of the tabbed wrappers already upon the conveyor, by operation of valve 36 to effect communication of the suction line 37 with atmosphere. The operating rod or bar 38 for valve 36 extends to position convenient to an operator of a box wrapping system including the mechanisms G and TM; it is connected to the operating arm of valve 36 by link 39 supported at its upper end by the arm 40 pivotally supported at 41 from a side member of the suction housing 15.

The extension or nose 85 of housing 15 is pivoted at 86 for movement in counter-clockwise direction when the frame 87, which supports the conveyor rolls 89, 90, 91, and wrapper feed roll 92, is thrown back about its pivot 88 for access to the glue roll 12, strippers 13 and other components of mechanism G.

To protect the conveyor belt 14, usually of fabric impregnated with rubber, from injury by the stripper blades 13, there is provided the bar 93, or equivalent stop structure (Figs. 1 and 4), which allows the blades 13 to be swung about the axis of their supporting rod 94 only to limited extent sufficient for cleaning or adjusting purposes. The bar 93 prevents a jammed wrapper from forcing the tips of the stripper blades 13 up sufficiently high to engage the belt 14; it allows the operator to adjust the blades 13 to desired position while the machine is in operation without fear of accidentally moving them to position causing injury to belt 14. Bar 93 can be removed or, after loosening of clamping screw 93A, swung to non-obstructing position when it is desired to replace blades 13; adjustable stop 93B determines the normal portion of bar 93.

Figures 4, 5, 6, 7, 8:
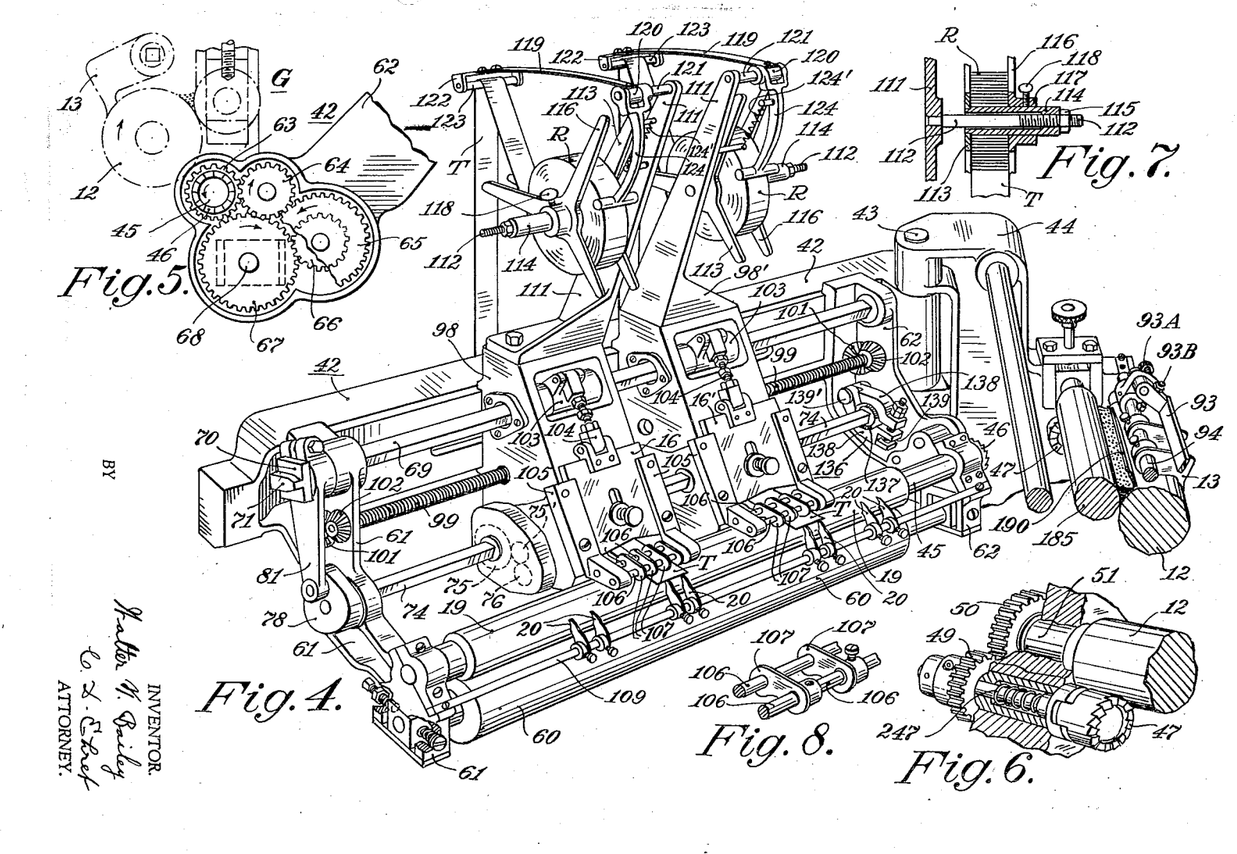
Fig. 4 is a perspective view of tabbing mechanism comprised in the machine of Fig. 1.
Fig. 5 is a detail view of gearing included in the tabbing mechanism, Fig. 4.
Fig. 6 in perspective shows the drive for a clutch member appearing in Fig. 4.
Fig. 7 is a detail view, in section, illustrating the construction of one of the reels of Fig. 4.
Fig. 8 is a detail view in perspective and on enlarged scale of tab-guiding elements of Fig. 4.

As more clearly shown in Fig. 4, the tabbing mechanism TM is carried by a bridge member 42 pivotally supported at 43 by one of the side frames 44 of the machine G; when tabbing mechanism TM is swung to the position shown in Fig. 4, convenient access is afforded to the adhesive-applying rolls and associated parts of the mechanism G and also to the adhesive-applying rolls, and to the tab-coating and severing elements of the tabbing mechanism TM. With bridge 42 in this position, the driving connections to the pairs of feed rolls 17 and 18, to the knives 16, 16' and to the tab-coating roll 19 are interrupted; these connections are automatically re-established, as hereinafter described, when the tabbing unit TM is swung about pivot 43 to the normal operating position shown in Fig. 1.

Referring particularly to Figs. 4, 5 and 6, to one end of shaft 45 of the tab-coating roll 19 there is attached the driven clutch member 46 which, when the tabbing mechanism TM is in operating position, is in engagement with the driving clutch member 47 slidably attached to shaft 48 connected, as by gears 49 and 50, to the shaft 51 of the wrapper-coating roll 12. Movement of the tabbing bridge to the position shown in Fig. 4, effects disengagement of clutch member 46, movable with the bridge, from clutch member 47 supported by the stationary frame member 44 of the machines; spring 247 yields to avoid injury to the toothed clutch members 46, 47 in event they are not exactly in mesh when bridge 42 is swung to operating position.

The wrapper-coating roll 12 is continuously rotated from shaft 52 of the gluing mechanism G so long as the members of the main clutch 53, Fig. 3, interposed between the motor 54 and shaft 52, are in engagement with each other. The gear train between shaft 52 and shaft 51 includes gear 55 on shaft 52, gear 56 which also serves as the driving member of the one-cycle clutch (1, 56) and the gears 178, 177, 58 and 59, Fig. 15.

The roll 60 (Figs. 1 and 4) supported by the side frames 61 and 62 of the tabbing mechanism TM serves, when the tabbing mechanism TM is locked or wedged in operating position, as by handle 194 (Fig. 16), to transfer adhesive from the reservoir 63 (Fig. 1) to the periphery of the tab-coating roll 19. The roll 60 is driven concurrently with tab-coating roll 19 of the tabbing mechanism through the gear train, Fig. 5, including gears 63, 64, 65, 66 and gear 67 suitably secured to the shaft 68 of the transfer roll 60. When bridge 42 is swung to the inoperative position, Fig. 4, the separation of clutch members 46, 47 effects interruption of rotation of roll 60.

Figures 16, 17, 18, 19:
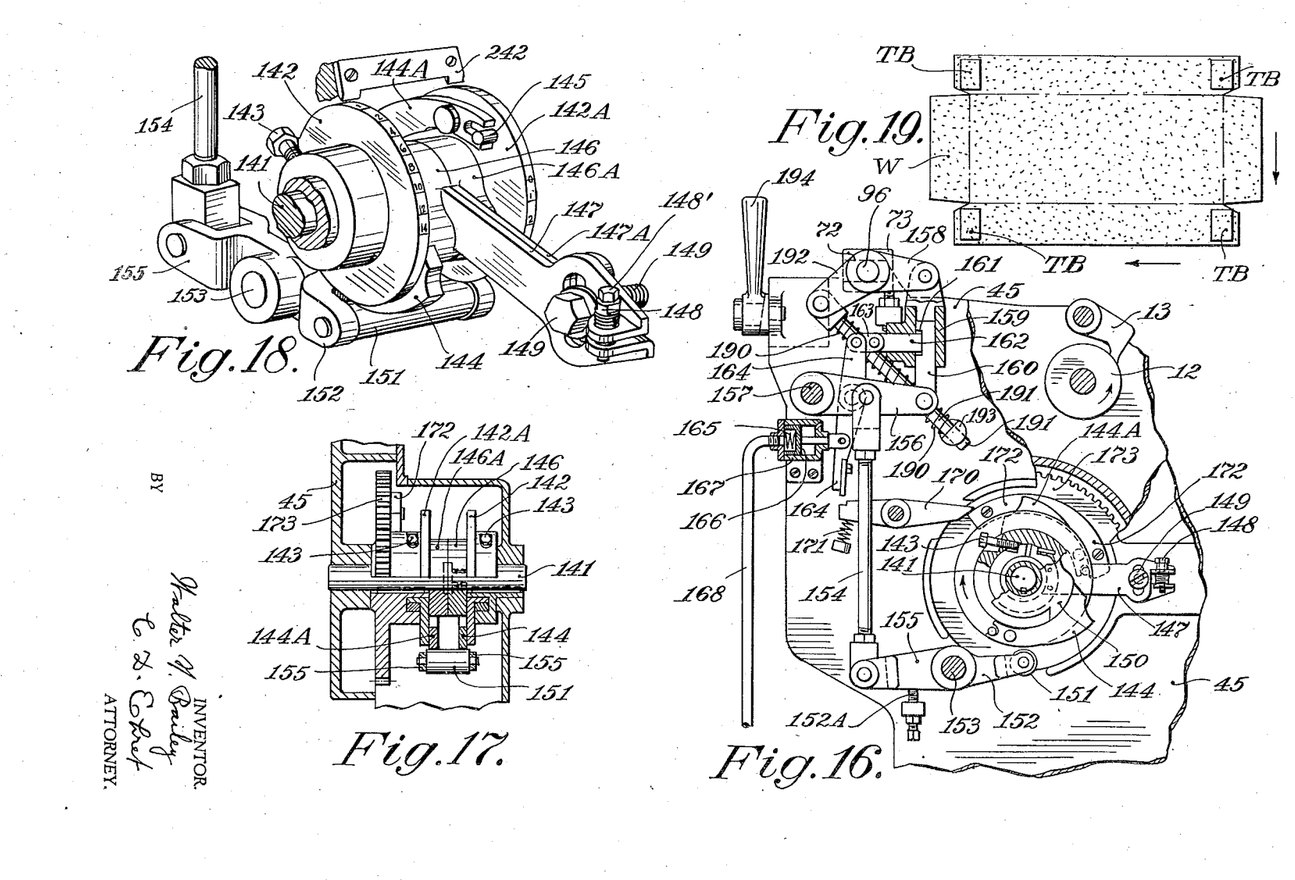
Fig. 16 is a side elevational view, partly in section and on enlarged scale, showing details of operating mechanism for the knives and feed-rolls of the tabbing mechanism of Fig. 4.
Fig. 17 is a front view, partly in section, of cams and associated elements appearing in Fig. 16.
Fig. 18 in perspective and on enlarged scale, shows significant elements of Figs. 16 and 17.
Fig. 19 is a plan view of a tabbed wrapper.

To the end of knife-operating shaft 69 which extends beyond the side frame 61 of the tabbing mechanism TM, there is attached the clutch member 70 comprising an elongated abutment or key 71 which, when the bridge member 42 is swung about its pivot 43 on side frame 44, from position shown in Fig. 4 to the operating position, is received by the slot 72 of an oscillatable clutch member 73, Fig. 16, pivotally supported upon the other side frame 45 of the gluing mechanism G.

As hereinafter described, the member 73, twice for each cycle of the adhesive-applying mechanism G, is rocked about its pivot 96; this motion, transmitted to shaft 69 through the clutch 70, 73, effects reciprocation of the knives 16, 16' to detach a pair of tabs, one from each of the strips T, T.

Figures 9, 10, 11, 12, 13, 14, 15:
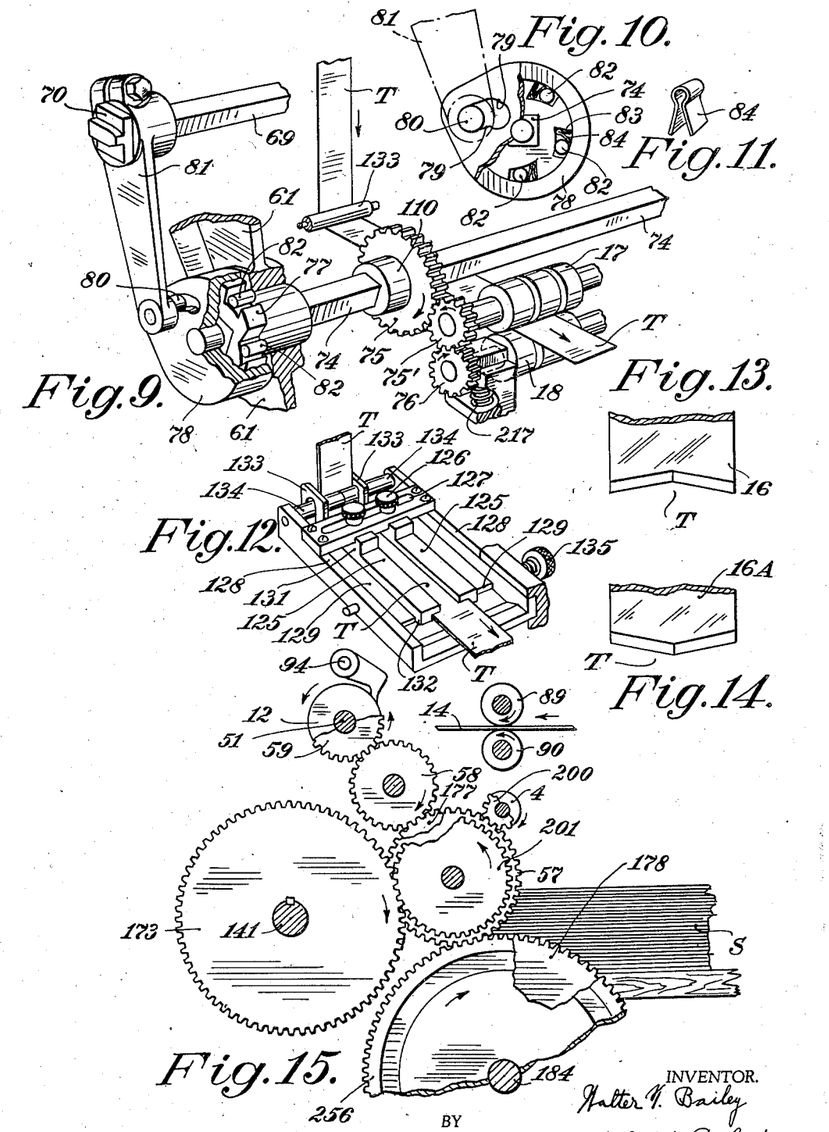
Fig. 9, in perspective and on enlarged scale, shows the drive for feed-rolls of the tabbing mechanism of Fig. 4.
Fig. 10 is a detail view, with parts broken away, of clutch mechanism shown in Fig. 9.
Fig. 11, in perspective, shows one of the clutch springs of Fig. 10.
Fig. 12, in perspective, shows one of the strip-guiding arrangements included in Fig. 4.
Figs. 13 and 14 show modifications of a tab-detaching knife.
Fig. 15 illustrates the drive for various elements of the machine shown in Fig. 1.

This motion of member 73 is also utilized to effect rotation of the pairs of tab-feeding rolls 17, 18 which, as appears in Fig. 9, are driven from shaft 74 of the tabbing unit TM through gearing comprising gears 75, 75' and 76.

To the end of shaft 74 which extends beyond side frame 61 is attached the driven member 77 of a uni-directional clutch mechanism. The cup-shaped driving member 78 of the clutch is provided with slot 79 for receiving pin 80 extending from arm 81 attached to the oscillatable clutch member 70. Each of the balls or rolls 82 disposed within the peripheral slots 83 of driven clutch member 77 is biased by a spring 84, Figs. 10 and 11, toward the shallower end of its recess so that when the driving clutch member 78 is moved in clockwise direction, Fig. 10, the rollers 84 tend to wedge in the slots or grooves and provide a driving engagement between the two clutch members. However upon reverse movement of the driving member 78, the rollers 82 are forced, against the bias of their springs, towards the deeper portion of the recesses and no motion is transmitted to the driven clutch member 77. The slot 79 in the driving clutch member 78 is shaped, Fig. 10, to provide lost motion between the arm 81 and the driving clutch member 78; for one direction of movement of the shaft 69, the lost motion permits the knives 16, 16' to be retracted or raised from the strips T, T, before the pairs of rolls 17 and 18 are moved to advance the tab strips.

The reverse or clockwise movement of shaft 69 which effects severance of strips T, T by knives 16, 16' is produced by spring 190, Fig. 16, which encircles the rod 191, pivotally connected at its upper end to arm 192 movable with clutch member 73 and at its lower end passing through post 193. Spring 190 is compressed between post 193 and a stop attached to rod 191.

In contrast with arrangements in which the feed rolls continuously rotate and intermittently engage the strip to feed it, the feed rolls 17, 18 of each pair are at all times maintained in engagement with the tab strip as by springs 217 so avoiding diversities in tab length due to undeterminable variations in the actual beginning and termination of movement of the strip; continuous engagement of rolls 17, 18 with the tab strips also avoids need for braking devices to prevent undesired retrograde movement of the strips by the web tensioning devices 119, 119 or equivalent; the strippers of guides 17', 18' associated with rolls 17, 18, serve principally to facilitate threading of a new tab strip through the head.

Each of the tabbing heads 98, 98' is adjustable along the bridge 42 to vary the spacing between tabs cut concurrently from strips T, T; for the purpose of adjusting them, there is secured within each of the heads 98, 98' a threaded member, not shown, which receives a threaded shaft 99 rotatable by a manually operable crank 100, Fig. 1, connected to the shaft as by gears 101, 102, Fig. 4.

The shaft 69 extends through both tabbing heads and in each of them is slidably received by a collar 103 whose non-circular bore snugly fits the shaft 69 to ensure rotation of the collar with shaft; as an alternative, shaft 69 may be of circular cross-section and provided with a key fitting a groove in the bore of the collars. Each of knives 16, 16' is connected to the corresponding collar member 103 by a link 104, preferably adjustable in length, pivotally connected at its opposite ends to the collar and the blade respectively to effect reciprocation of the knives as above described.

The pair of members 105 which guide each of the blades 16, 16' extend forwardly from the head 98 or 98' over the adhesive-applying roll 19 to provide supports for a pair of guide rods 106, 106 to which are adjustably secured the tab-control plates 107, 107. As more clearly appears in Fig. 8, the lower edge of each of these members 107 is concave substantially to conform with the periphery of roll 19 and to direct tab strip T into engagement therewith.

To avoid tendency for the tab strip, particularly when wide, to be forced askew during detachment of tabs therefrom and/or for the ends of the tabs to be cut on an angle other than at desired right angle to the sides of the tab, the usual knife arrangement in which the shearing action begins at one edge of the strip and continues progressively across to the opposite edge is replaced by one in which the tab strip is cut simultaneously from or toward both edges, for example by a knife having a V, or equivalent, shaped cutting edge.

In Fig. 13, the knife edge outline is of hollow V shape so that shearing of the tab strip begins substantially simultaneously at both edges of the strip and progresses from opposite edges towards the center; in Fig. 14, the knife is a solid V so that shearing action begins at the center of the tab strip and progresses outward therefrom toward the opposite edges. With either of these knife arrangements, or equivalent, the severance of each tab is effected without tendency to push the tab or the tab strip sideways away from the desired position. It is thus ensured the tabs are of desired size and shape and are eventually disposed in proper positions upon the wrappers.

The leading end of each tab is deflected from the adhesive-applying roll 19 toward engagement with roll 12 by stripper blades 20 adjustably secured to the rod 109 extending between the frame members 61, 62 of the bridge 42. When the heads 98, 98' are adjusted transversely of bridge 42, the strippers 20 are also readjusted to proper relative position; preferably each in alignment with one of plates 107, the number of which in use may vary for different widths of tabs.

The shaft 74 of the tabbing mechanism, Figs. 4 and 9, extends through both tabbing heads 98, 98' and in each of them is slidably received by the hub 110 of the driving gear 75 for the feed rolls 17, 18; accordingly the step-by-step rotation of shaft 74 effects corresponding movement in unison of both pairs of feed rolls intermittently to advance the strips T, T.

To each of the heads 98, 98' is attached a bracket 111 from which extends a threaded shaft 112, Figs. 4 and 7. One spider member 113 is attached to the sleeve 114 which is locked in desided position along shaft 112, as by nut 115 or equivalent; the other spider member 116 comprises a hub portion 117 adjustably secured as by the thumb screw 118 to the sleeve 114. When it is desired to replace or substitute a new roll R of tabbing material, it is only necessary to loosen the thumb screw 118 and slide the spider 116 off of sleeve 114; then after a new roll has been disposed upon sleeve 114, the spider 116 is replaced and thumb screw 118 retightened with assurance the new tab strip is in proper alignment with tab guides 125, 125 Fig. 12, without need of further adjustment.

The brake 136, of any suitable construction, ensures the tabs shall be of desired and constant length by preventing shaft 74 from moving, due to inertia, beyond the angular position corresponding with the end of the strip-feeding stroke of arm 81; it may, Fig. 4, comprise a drum or sleeve 137 attached to shaft 74 and engaged by brake members 138 suitably pivotally supported at 139' to side frame 62 of bridge 42 and pressed against drum 137 by spring 139. The drum-engaging faces of members 138 are preferably faced with suitable brake lining and the pressure of spring 139 is preferably adjustable to obtain the desired braking effect without excessive load upon the clutch 78.

To prevent slack in each strip T and overrunning of the corresponding roll R, there is provided for each head 98, 98', a web-tensioning and roll-braking arrangement comprising a spring 119 attached to sleeve 120 which is supported by a pin 121 extending from the top of the corresponding bracket 111. To the other end of each spring 119 is attached a U-shaped bracket 122 for supporting an idler roll 123 over which the tab strip T passes. A brake member 124 pivotally supported by each pin 121 is biased by gravity and/or spring 124' toward the periphery of the corresponding roll R of tabbing material.

To maintain proper alignment of the tab strips, each head is provided, Fig. 12, with a pair of adjustable guide bars 125 complementarily notched to overlie the opposite edges of strip T. The guide bars are held in desired position relative to the strip T by the clamping members 126 whose stems pass through a slotted bar 127, extending between the sides 128, 128 of the guide assembly, threadably to engage the bars 125, 125 respectively. To maintain these bars in alignment during their adjustment to different positions, they are provided with shoulders 131, 132 which engage the bar 127 and the forward edge of plate 129 respectively.

Each guide bar 125 is provided with a hooked extension 133 which straddles the idler pulley or sleeve 134; these extensions restrict transverse movement of the substantially inclined portion of tab strip T approaching the guide assembly. Thumb screws 135, or equivalent, clamp each guide assembly in desired position upon and with respect to the associated tabbing head 98 or 98'.

The mechanism for effecting operation of the tab-feeding rolls and the knives of the tabbing heads and providing for automatic discontinuance of their operation upon failure of the suction gripper 5 to pick up a wrapper is shown in Figs. 15 to 18 inclusive.

To the shaft 141 driven through gears 173, 201, 57 and 256 to make one revolution for each cycle of mechanisms G, are adjustably secured, as by bolts 143, two disks 142, 142A upon each of which is pivotally supported a cam member (144 or 144A) capable of swinging through an angle limited by a stop pin 145 extending from the corresponding disk. The shaft 141 rotates freely within sleeves 146, 146A from which extend the arms 147, 147A respectively having at their outer ends screw 148 and lock screw 148' adjustable to vary the relative angular positions of arms 147, 147A. These arms are clamped as a unit in desired angular position with respect to the axis of shaft 141 by the bolt 149 which passes through slots in the arms threadably to engage the frame member 45 of mechanism G. To each of the collars 146, 146A is attached an abutment 150 of suitable angular extent for engaging the inner surface of the corresponding cam member 144, or 144A.

As the disks 142, 142A rotate in unison, the cams 144, 144A in succession engage the roller 151 supported by the arm 152 pivotally mounted at 153 to frame member 45. The extent to which each cam effects movement of the arm 152 away from stop 152A, and therefore the extents to which the pairs of feed-rolls 17, 18 advance the tab strips T, T, depends upon the angular settings of abutments 150 with respect to the axis of shaft 141. Cams 144, 144A are preferably so shaped the velocity of the tab strip at the time its leading edge meets roll 19 is of the order of or approximately the same as the linear velocity of roll 12. As each cam rides off the corresponding abutment 150, arm 152 swings in counterclockwise direction to position determined by adjustable stop 152A under the influence of spring 190 and so permits reverse movement of the clutch member 73 interposed between the the cams 144, 144A and the shafts 69 and 74 of the tabbing mechanism.

The linkage for transmitting movement of arm 152 to clutch member 73 includes the link 154 pivotally connected at its lower end to arm 155 movable with arm 152 and at its upper end pivotally connected to lever 156 pivotally mounted at 157 to the frame member 45 of mechanism G. Between arm 156 and arm 158 which is movable with clutch member 73, is interposed a disengageable connection comprising the sleeve member 159 pivotally suspended from arm 158 and the plunger 160 reciprocable within the sleeve 159 and pivotally supported by arm 156. The plunger 160 is notched or recessed at 161 to receive the inner end of the latch member 162 slidably supported by sleeve 159 and connected by link 163 to the arm 164 biased to latch-releasing position by spring 165 and movable to the position shown in Fig. 16 by the piston 166 disposed within cylinder or chamber 167 connected by pipe 168 to the suction line 37, Fig. 1.

Assuming the suction head 5 has lifted a wrapper from stack S, the pressure in the line 37 is low or sub-atmospheric; accordingly piston 166 is moved to the left against the opposition of spring 165 to the position shown in Fig. 16 to establish connection between sleeve 159 and plunger 160 by the latch 162. This connection is maintained for the remainder of the cycle, nothwithstanding bleeder valve 9 is opened as previously herein described for release of the sheet to feed rolls 3, 4, by the locking arm 170 biased to locking engagement with arm 164 by spring 171 and permitted to move to that position, suitably in advance of operation of valve 9, by the cam 172, Figs. 16 and 17, attached to the gear 173 rotating in unison with the tab control disks 142, 142A.

If and when the suction gripper 5 fails to lift a wrapper, as because of depletion of the stack, manipulation of valve 36 by the operator, or for any other cause, the pressure in line 168 is not sufficiently below atmospheric pressure to overcome the bias of spring 165; the latch 162 consequently remains withdrawn from recess 161 of plunger 160 and the reciprocation of the plunger by arm 152 is not transmitted to the knives and feed rolls of the tabbing heads. In brief, if a wrapper is not removed from the stack no tabs are fed to roll 12 thus avoiding not only waste of tab material but also avoiding smearing of the conveyor belt 14 with adhesive.

The interruption of feed of tabs does not preclude continued operation of conveyor 14 desirably to advance, step-by-step, the tabbed wrappers already on the conveyor. The conveyor drive mechanism, of suitable known type, such as disclosed in aforesaid application Serial No. 397,894, includes, Fig. 3, the clutch members 174, 175, the former continuously connected by the gear train including gears 174A, 176, 177 to gear 178 continuously rotating so long as the members of the main clutch 52, 53 are in engagement.

Clutch member 175 slidably keyed to shaft 179 is operable by lever 180 pivoted at 181 to the frame of machine G with its lower end in the paths of movement of the cams 182, 183 for alternate engagement thereby. The angular position of one or both of these cams is adjustable with respect to shaft 184, which rotates once per cycle of machine G. For that fraction of each cycle for which clutch members 174, 175 are in engagement, the driving roll 90 of conveyor belt 14 is operatively connected to gear 178 by a gear train including gear 186 attached to the shaft of roll 90, gear 187 free to rotate upon the shaft of wrapper feed-roll 4, gear 188 attached to shaft 179, clutch members 174, 175, and gears 174A, 176, 177 and 178.

Each time the one-cycle clutch comprising members 1 and 56 is tripped, manually by an operator or automatically as by a box-wrapping machine, not shown, the conveyor 14 advances to predetermined extent the wrappers, tabbed wrappers, or assemblies of wrappers with boxes or box blanks thereon, whether or not the operator has intentionally disabled the wrapper-feeding mechanism by opening valve 36, and whether or not the tabbing mechanism has been automatically disabled by the mechanism shown in Figs. 16 to 18.

To suit the limitations or requirements of associated mechanisms such as box-wrapping mechanism, blank bending mechanism or for convenience of the operator, the wrappers may be fed either endwise or sidewise, as indicated by the arrows, Fig. 19, to conveyor 14 from the stack and in like position transported by conveyor 14. In dependence upon the dimension of the wrappers and upon which way they are fed, the tabbing heads are adjusted transversely of the bridge 42 to determine the spacing of the tabs TB as measured in direction normal to the direction of feed of the wrappers; and the cam abutments 150 are adjusted to determine the lengths of the tabs TB as measured in the direction of feed of the wrappers.

To facilitate setting of disks 142, 142A in determination of the distances from the front and rear tabs to the leading edge of the wrapper, they may, Fig. 18, be provided with scales, calibrated in inches for example, for co-action with the stationary index 242. By suitable relative adjustment of discs 142, 142A, a single long tab may be cut from each strip T for each cycle of the machine.

By adjustment of links 104, the movements of knives 16, 16 may be so timed relatively to each other that the pair of tabs cut thereby from strips T, T for each oscillation of shaft 69 are equally spaced from the leading edge of the wrapper to which applied.

What I claim is:

1. Tabbing mechanism comprising feed rolls continuously in engagement with a strip of tabbing material, reciprocable knife structure for severing said strip beyond said rolls, an oscillating member, means for connecting said knife structure to said member for movement in unison therewith, and means for connecting said member to said feed rolls including a periodically actuated uni-directional clutch periodically rotating said rolls only during movement of said knife structure in direction away from said strip and a lost-motion connection delaying rotation of the rolls until said knife structure is clear of the path of said strip and delaying severance of the strip by said knife structure for a substantial period after said rolls come to rest.

2. Tabbing mechanism comprising a pair of shafts, rolls for feeding a strip of tabbing material continuously connected to one of said shafts, knife structure for severing said strip continuously connected to the other of said shafts, means including a uni-directional clutch for coupling said shafts, and means for oscillating said other of said shafts to effect operation of said knife structure and intermittent rotation of said rolls.

3. Tabbing mechanism comprising a pair of shafts, tabbing heads adjustable toward and from each other axially of said shafts, feed rolls within each of said heads continuously connected to one of said shafts, knife structure within each of said heads continuously connected to the other of said shafts and operable to sever a strip of tabbing material fed by the associated feed rolls, means external to said heads including a uni-directional clutch for coupling said shafts, and means for oscillating said other of said shafts intermittently to effect advance of said strips by said feed rolls and to effect severance by said knife structures of the advanced portions of the strips.

4. Tabbing mechanism comprising rolls for feeding a strip of tabbing material, knife structure biased to sever said strip, means including a uni-directional clutch for coupling said rolls to said knife structure, a member movable in one direction to effect movement of said knife structure away from said strip in opposition to its bias and to effect rotation of said feed rolls through said clutch, and cam means adjustable to vary the extent of movement of said member in determination of the length of tabs cut by said knife structure from the portion of the strip fed by said rolls.

5. Tabbing mechanism comprising rolls for feeding a strip of tabbing material, means including an oscillating member and a uni-directional clutch for effecting intermittent rotation of said rolls in one direction, and means for varying the length of the tabs comprising cam means controlling the amplitude of movement of said member in determination of the extent of feed of said strip per oscillation of said member.

6. Tabbing mechanism comprising a tabbing head, rolls within said head for feeding a strip of tabbing material, reciprocable knife structure slidably supported by said head for severing tabs from said strip, an oscillatable member for effecting rotation of said rolls, means for varying one limit of movement of said member to vary the extent of feed of said strip per oscillation of said member, and a link connecting said member to said knife structure disposed externally of said head and of length adjustable to predetermine one limit of reciprocation of said knife structure.

7. Tabbing mechanism comprising knife structure for severing tabs from a strip of tabbing material, structure for guiding the strip to said knife structure, and means for positioning a roll of said strip comprising two members for engaging opposite sides of said roll, adjustable in unison to effect alignment of the roll with said guide structure, and one of which is removable for replacement of said roll while the other of them remains in adjusted position.

8. Tabbing mechanism comprising means for feeding a strip of tabbing material, means for cutting said strip to form tabs, supporting structure for said feeding and cutting means, and a guide assembly comprising a base member detachably mounted upon said structure and guide members for engaging opposite sides of said strip adjustably secured to said detachable base member.

9. Tabbing mechanism comprising feed rolls continuously in engagement with a strip of tabbing material, mechanism for effecting within a cycle of said first-named mechanism intermittent periods of rotation of said rolls, a disengageable connection between said second-named mechanism and said feed rolls comprising reciprocable members and pneumatically actuated means for releasably coupling said members, and control means operable during each cycle of the tabbing mechanism to effect actuation of said coupling means.

10. Mechanism for applying tabs to flexible sheets comprising rolls for feeding a strip of tabbing material, knife structure for cutting tabs from said strip, mechanism for effecting reciprocation of said knife structure and intermittent rotation of said rolls, a device for feeding sheets to be tabbed, and means, including fluid-pressure control means, responsive to failure of said device to feed a sheet for preventing operation of said rolls and of said knife structure by said mechanism.

11. Mechanism for applying tabs to flexible sheets comprising rolls for feeding a strip of tabbing material, knife structure for cutting tabs from said strip, a common operating member for said rolls and said knife structure, a source of oscillatory motion, means for disengageably coupling said source to said member, means for feeding sheets to be tabbed, and means responsive to failure of said sheet-feeding means to feed a sheet for disabling said coupling means.

12. Mechanism for applying tabs to flexible sheets comprising rolls for feeding a strip of tabbing material, knife structure for cutting tabs from said strip, a common operating member for said rolls and said knife structure, a source of oscillatory motion, means for disengageably coupling said source to said member comprising structure movable to coupling and de-coupling positions, means for feeding sheets to be tabbed, and means controlled by said feeding means at a predetermined time in a cycle of said mechanism to actuate said structure to coupling position only if said feeding means is at that time engaging a sheet.

13. Mechanism for applying tabs to flexible sheets comprising rolls for feeding a strip of tabbing material, knife structure for cutting tabs from said strip, a common operating member for said rolls and said knife structure, a source of oscillatory motion, means for disengageably coupling said source to said member comprising structure movable to coupling and de-coupling positions, suction means for feeding sheets to be tabbed, pressure responsive means controlled by said feeding means at predetermined time in a cycle of said mechanism to actuate said structure to coupling position only if said feeding means is at that time engaging a sheet, and means for maintaining said structure in coupling position, after separation of the sheet from said suction means, for the remainder of the cycle.

14. Tabbing mechanism comprising feed rolls continuously in engagement with a strip of tabbing material, means effecting within a cycle of said mechanism a plurality of periods of rotation of said rolls in one direction to advance said strip, means operable within said cycle while said rolls are during intervening periods holding the strip stationary for severing successive leading portions of the strip, and means for varying the time intervals, within the cycle, between the periods of rotation of said rolls and between severances of said successive leading portions of the strip.

WALTER T. BAILEY.